(12) United States Patent
Park et al.

(10) Patent No.: US 9,301,336 B2
(45) Date of Patent: *Mar. 29, 2016

(54) COMMUNICATION METHOD IN WLAN SYSTEM

(71) Applicant: LG ELECTRONICS INC., Seoul (KR)

(72) Inventors: Jong Hyun Park, Anyang-si (KR); Eun Sun Kim, Anyang-si (KR); Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,912

(22) Filed: Jun. 30, 2015

(65) Prior Publication Data

US 2015/0305088 A1  Oct. 22, 2015

Related U.S. Application Data

(63) Continuation of application No. 14/232,827, filed as application No. PCT/KR2012/005759 on Jul. 19, 2012, now Pat. No. 9,084,230.

(60) Provisional application No. 61/509,546, filed on Jul. 19, 2011.

(51) Int. Cl.
| | |
|---|---|
| H04W 88/04 | (2009.01) |
| H04W 52/02 | (2009.01) |
| H04W 8/00 | (2009.01) |
| H04W 48/10 | (2009.01) |
| H04W 76/02 | (2009.01) |
| H04W 48/14 | (2009.01) |
| H04B 7/155 | (2006.01) |
| H04W 52/38 | (2009.01) |
| H04W 84/12 | (2009.01) |

(52) U.S. Cl.
CPC ............... *H04W 88/04* (2013.01); *H04B 7/155* (2013.01); *H04W 8/005* (2013.01); *H04W 48/10* (2013.01); *H04W 48/14* (2013.01); *H04W 52/0209* (2013.01); *H04W 52/383* (2013.01); *H04W 76/02* (2013.01); *H04W 76/023* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2008/0069047 A1 | 3/2008 | Yee et al. | |
| 2009/0073913 A9 | 3/2009 | Wentink | |
| 2009/0274135 A1 | 11/2009 | Seok | |
| 2010/0014458 A1 | 1/2010 | Singh et al. | |

(Continued)

FOREIGN PATENT DOCUMENTS

| | | |
|---|---|---|
| KR | 1020090094673 A | 9/2009 |
| KR | 1020090098423 A | 9/2009 |

*Primary Examiner* — Edan Orgad
*Assistant Examiner* — Saumit Shah
(74) *Attorney, Agent, or Firm* — Dentons US LLP

(57) ABSTRACT

A communication method performed by a station (STA) in a Wireless Local Area Network (WLAN) system is provided. The method includes: broadcasting a Direct Link Setup (DLS) discovery request frame for discovering a destination STA with which a direct link will be set up; receiving a DLS discovery response frame from the destination STA in response to the DLS discovery request frame; setting up the direct link with the destination STA; and transmitting a data frame to an Access Point (AP). The step of transmitting the data frame comprises transmitting the data frame to the destination STA through the direct link. The data frame received by the destination STA is relayed to the AP.

10 Claims, 6 Drawing Sheets

(56) References Cited

U.S. PATENT DOCUMENTS

2011/0038291 A1 2/2011 Seok
2011/0145421 A1 6/2011 Yao et al.

COMMUNICATION METHOD IN WLAN SYSTEM

This application is a continuation of application Ser. No. 14/232,827 filed Jan. 14, 2014, which is a 35 USC §371 National Stage entry of International Application No. PCT/KR2012/005759, filed on Jul. 19, 2012, which claims priority to U.S. Provisional Application No. 61/509,546, filed on Jul. 19, 2011, all of which are hereby incorporated by reference in their entirety.

TECHNICAL FIELD

The present invention relates to wireless communication and, more particularly, to a communication method in a Wireless Local Area Network (WLAN) system and an apparatus supporting the same.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

Meanwhile, as the propagation of a WLAN is being activated, there appears an environment in which one AP provides service to a large number of non-AP STAs. Furthermore, as mobile devices type non-AP STAs which support a WLAN are increased, there is a need for a method of supporting increased mobility.

An environment in which a plurality of STAs is placed in one WLAN system may include, for example, a Machine to Machine (M2M) network. Unlike the existing WLAN system in which a person accesses an AP through a non-AP STA and receives service, the M2M refers to a network in which a machine supporting WLAN communication becomes the subject and exchanges pieces of information.

The introduction of a WLAN system supporting M2M and an increase in the mobility of an STA may be associated with the operation of an STA based on the battery. For this reason, the power management of an STA may become more important. Accordingly, there is a need for an efficient communication method in terms of the power management of an STA in this WLAN environment.

SUMMARY OF INVENTION

Technical Problem

The present invention provides a communication method performed by an STA in a WLAN system STA and an apparatus supporting the same.

Solution to Problem

In an aspect, a communication method performed by a station (STA) in a Wireless Local Area Network (WLAN) system is provided. The method includes: broadcasting a Direct Link Setup (DLS) discovery request frame for discovering a destination STA with which a direct link will be set up; receiving a DLS discovery response frame from the destination STA in response to the DLS discovery request frame; setting up the direct link with the destination STA; and transmitting a data frame to an Access Point (AP). The step of transmitting the data frame comprises transmitting the data frame to the destination STA through the direct link. The data frame received by the destination STA is relayed to the AP.

The DLS discovery response frame may include a DLS destination STA address field indicating a Medium Access Control (MAC) address of the destination STA.

The step of setting up the direct link with the destination STA may includes transmitting a DLS request frame to the destination STA via the AP and receiving a DLS response frame from the destination STA via the AP in response to the DLS request frame. The DLS request frame may include information indicating the MAC address of the destination STA indicated by the DLS destination STA address field.

The DLS discovery request frame may include a discovery timeout value field indicating a time taken for the STA to transmit the DLS discovery request frame and to receive the at least one DLS discovery response frame.

The DLS discovery response frame may be received before a lapse of the time indicated by the discovery timeout value field from a time when the DLS discovery request frame is transmitted.

The method may further include receiving the data frame transmitted by the AP.

The step of receiving the data frame may include: transmitting, by the AP, the data frame to the destination STA, relaying, by the destination STA, the received data frame to the STA through the direct link and receiving the relayed data frame.

In another aspect, a communication method performed by a station (STA) in a Wireless Local Area Network (WLAN) system is provided. The method includes: receiving a Direct Link Setup (DLS) discovery request frame for discovering an STA with which a direct link will be set up from a source STA; transmitting a DLS discovery response frame to the source STA in response to the DLS discovery request frame; setting up the direct link with the source STA; receiving a data frame intended to be transmitted to an Access Point (AP) from the source destination through the direct link; and relaying the data frame to the AP.

The DLS discovery response frame may include a DLS source STA address field indicating a Medium Access Control (MAC) address of the source STA.

The step of setting up the direct link with the source STA may include receiving a DLS request frame from the source STA via the AP and transmitting a DLS response frame to the source STA via the AP in response to the DLS request frame. The DLS request frame may include information indicating the MAC address of the source STA indicated by the DLS source STA address field.

The DLS discovery request frame may include a discovery timeout value field indicating a time taken for the source STA to transmit the DLS discovery request frame and to receive the at least one DLS discovery response frame.

The DLS discovery response frame may be transmitted before a lapse of the time indicated by the discovery timeout value field from a time when the DLS discovery request frame is transmitted The method may further include receiving a data frame intended to be transmitted to the source STA from the AP and relaying the data frame through the direct link so that the data frame is transmitted to the source STA.

In still another aspect a wireless apparatus operated in a Wireless Local Area Network (WLAN) system is provided. The wireless apparatus includes a transceiver configured to transmit and receive radio signals and a processor operably coupled to the transceiver. The processor is configured to: receive a Direct Link Setup (DLS) discovery request frame for discovering an STA with which a direct link will be set up from a source STA; transmit a DLS discovery response frame to the source STA in response to the DLS discovery request frame; set up the direct link with the source STA; receive a data frame intended to be transmitted to an Access Point (AP) from the source destination through the direct link; and relay the data frame to the AP.

Advantageous Effects of Invention

In accordance with an embodiment of the present invention, in a WLAN environment, a direct link is set up between a chargeable STA and an unchargeable STA, and the chargeable STA receives a frame intended to be transmitted from the unchargeable STA to an AP from the unchargeable STA and relays the frame. The unchargeable STA may transmit the frame to the chargeable STA by using transmit power lower than transmit power that is used to directly transmit the frame to the AP, and the frame may be normally transmitted to the AP. Accordingly, the unchargeable STA can reduce power consumption necessary to transmit the frame, and the life span of the battery of the unchargeable STA can be improved.

In accordance with another embodiment of the present invention, an unchargeable STA is operated in an awake state in the time interval where a chargeable STA transmits a frame by using transmit power lower than a predetermined value and is operated in a doze state in the remaining time intervals. The unchargeable STA can avoid unnecessary power consumption through the doze state operation during time intervals not related to the exchange of frames, and thus the life span of the battery of the unchargeable STA can be improved.

MODE FOR THE INVENTION

Figure 1:
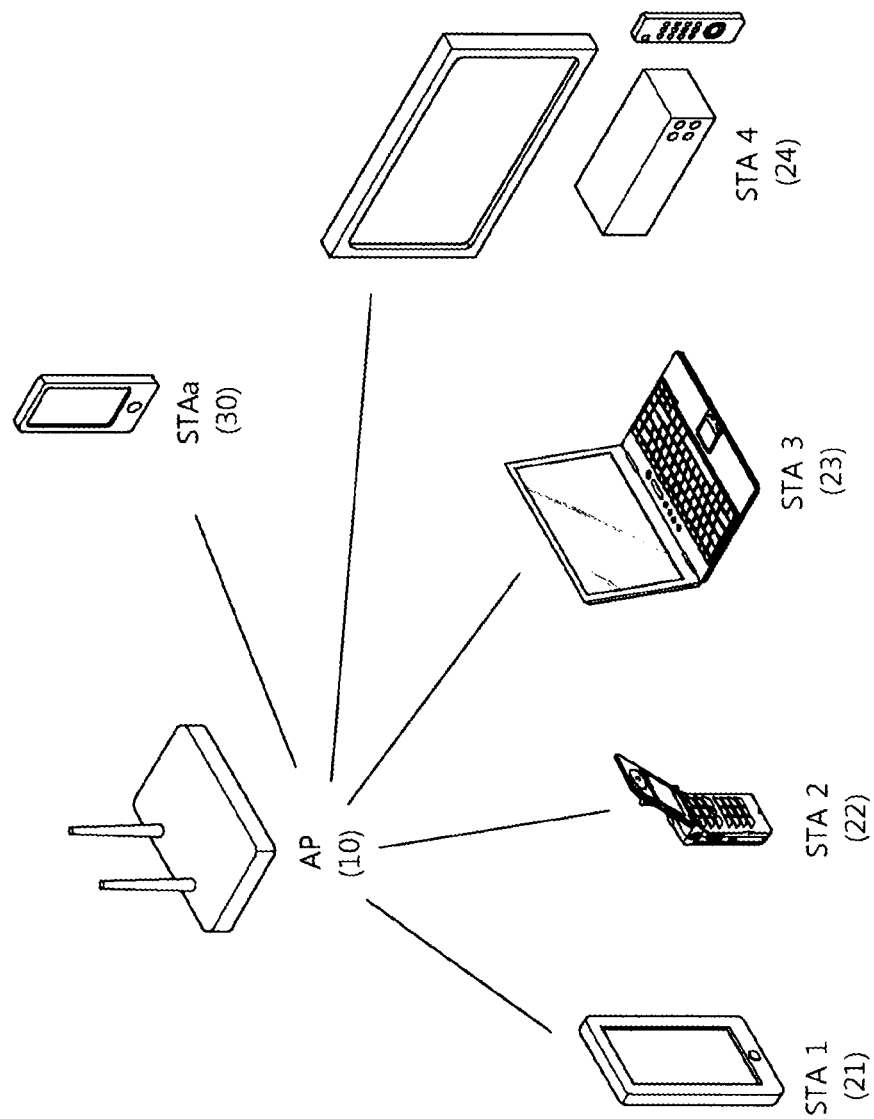
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1 21, STA2 22, STA3 23, STA4 24, and STAa 30, an AP (Access Point) 10 providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

The IEEE 802.11 MAC protocol, together with a Distributed Coordination Function (DCF), provides a Hybrid Coordination Function (HCF) based on a Point Coordination Function (PCF) of performing periodical polling by using the DCF and a polling-based synchronous access method so that all reception APs or STAs or both can receive data packets. The HCF includes contention-based Enhanced Distributed Channel Access (EDCA) and HCF Controlled Channel Access (HCCA) using a contention-free-based channel access scheme employing polling mechanism as access schemes used by a provider in order to provide data packets to a plurality of users. The HCF includes a medium access mechanism for improving Quality of Service (QoS) of a WLAN, and QoS data can be transmitted in both a Contention Period (CP) and a Contention-Free Period (CFP).

In a wireless communication system, an STA cannot know the existence of a network immediately when the STA is turned on and the STA starts operating from a viewpoint of a wireless medium. Accordingly, any type of an STA should perform a network discovery process in order to access a network. The STA that has discovered networks through the network discovery process selects a network to be joined through a network selection process. Next, the STA joins the selected network and performs a data exchange operation performed in a transmission terminal/reception terminal.

In a WLAN system, a network discovery process is embodied by a scanning procedure. The scanning procedure is divided into passive scanning and active scanning. Passive scanning is performed based on a beacon frame that is periodically broadcasted by an AP. In general, in a WLAN, an AP broadcasts a beacon frame at a specific interval (e.g., 100 msec). The beacon frame includes information about a BSS managed by the beacon frame. An STA waits passively in order to receive the beacon frame in a specific channel. The STA obtains information about a network from the received beacon frame and then terminates the scanning procedure in the specific channel. Passive scanning is advantageous in that overall overhead is small because the passive scanning is performed if an STA has only to receive a beacon frame without a need to transmit an additional frame, but is disadvantageous in that the time taken to perform scanning is increased in proportion to the transmission period of a beacon frame.

In contract, in active scanning, an STA broadcasts a probe request frame actively in a specific channel and requests information about networks from all APs that have received the probe request frame. An AP that has received the probe request frame waists for a random time in order to prevent a collision between frames and transmits a probe response frame, including information about a network, to the STA. The STA receives the probe response frame, obtains the information about networks from the probe response frame, and then terminates the scanning procedure. Active scanning is advantageous in that scanning can be finished within a relatively short time, but is disadvantageous in that overall network overhead is increased because a frame sequence according to a request and a response is necessary.

The STA that has finished the scanning procedure selects a network according to its specific criterion and then, together with the AP, performs an authentication procedure. The authentication procedure is performed according to a 2-way handshake. The STA that has finished the authentication procedure, together with the AP, performs an association procedure.

The association procedure is performed according to a 2-way handshake. First, the STA transmits an association request frame to the AP. The association request frame includes information about the capabilities of the STA. The AP determines whether or not to permit association with the STA based on the information about the capabilities. The AP that has determined whether or not to permit association with the STA transmits an association response frame to the STA. The association response frame includes information indicating whether association has been permitted or not and information indicating a reason when association is permitted or failed. The association response frame further includes information about capabilities supportable by the AP. If the association is successfully completed, frames are normally exchanged between the AP and the STA. If the association is failed, the association procedure is attempted again based on information about a failure reason included in the association response frame or the STA may request association from another AP.

In order to overcome a limit to the communication speed that was considered as being weakness in a WLAN, IEEE 802.11n has been recently established as a technical standard. An object of IEEE 802.11n is to increase the speed and reliability of a network and to extend the coverage of a wireless network. More particularly, in order to support a High Throughput (HT) having a maximum data processing speed of 540 Mbps or higher, minimize an error in transmission, and optimize the data speed, IEEE 802.11n is based on Multiple Inputs and Multiple Outputs (MIMO) technology using multiple antennas on both sides of a transmitter and a receiver.

As a WLAN is actively propagated and applications employing the WLAN are diversified, there is a need for a new WLAN system that supports a throughput higher than the data processing speed supported by IEEE 802.11n. The next-generation WLAN system that supports a Very High Throughput (VHT) is a next version of an IEEE 802.11n WLAN system and is one of IEEE 802.11 WLAN systems which have recently been newly proposed in order to support a data processing speed of 1 Gbps or higher in a MAC Service Access Point (SAP).

The next-generation WLAN system supports transmission using a Multi-User Multiple Input Multiple Output (MU-MIMO) method in which a plurality of STAs accesses a radio channel at the same time so that the channel can be efficiently used. In the MU-MIMO transmission method, an AP can transmit a packet to one or more MIMO-paired STAs.

Meanwhile, with the recent advent of various communication services, such as smart grid, e-Health, and ubiquitous, Machine to Machine (M2M) technology for supporting the various communication services has been in the spotlight. Each of a sensor for detecting temperature or humidity, a camera, home appliances, such as TV, a process machine in a factory, and a large machine, such as a vehicle, may become one of elements that form an M2M system. Elements forming the M2M system may transmit and receive data based on WLAN communication. A case where elements forming an M2M system support a WLAN and configure a network is hereinafter called an M2M WLAN system.

A WLAN system supporting M2M has the following characteristics.

1) A large number of STAs: It is assumed that the M2M includes a number of STAs within a BSS, unlike in the existing network. This is because not only devices owned by a person, but also sensors, etc. installed in a home or company are taken into consideration. Accordingly, numerous STAs may be connected to one AP.

2) A low traffic load per STA: In an M2M system, an STA does not need to transmit information frequently and the amount of the information is relatively small because the STA has a traffic pattern that pieces of surrounding information are gathered and reported.

3) Communication focused on uplink: The M2M is chiefly configured to receive a command in downlink, take action, and report resulting data in uplink. In a system supporting the M2M, uplink becomes the center because major data is commonly transmitted in uplink.

4) The power management of an STA: An M2M terminal is chiefly operated by the battery, and it is difficult for a user to charge the battery frequently. Accordingly, there is a need for a power management method of minimizing battery consumption.

5) An automatic recovery function: a device forming an M2M system needs an autonomous recovery function because it is difficult for a person to directly manipulate the device in a specific situation.

From among the characteristics of a WLAN system which supports the M2M, in particular, a communication environment in which numerous STAs are connected to an AP may becomes an embodiment to which communication methods proposed by the present invention may be effectively applied. Accordingly, in describing the embodiments of the present invention hereinafter, a WLAN system which supports the M2M is described as an example. The communication method proposed by the present invention is not limited to a WLAN system supporting the M2M, but may be applied to common WLAN systems and communication systems.

The most common server/client structure, from among the existing network models other than the M2M is described below. In most cases, a client (i.e., an STA) requests information from a server, and the server transmits relevant information (or data) to the STA. The server that provides the information may be considered as a machine which collects pieces of information mechanically and provides the collected information. The subject that has received the information becomes a user that has used the client (i.e., the STA). The characteristic of this network model corresponds to a reason why lots of communication techniques have been developed based on downlink.

In a network which supports the M2M, however, the structure is reversed. In other words, the client (i.e., the STA), that is, the machine, functions to collect pieces of information and provide the information. In contrast, a user that manages the server requests the information. That is, in an M2M WLAN system, a network model in which a server issues a command, such as the measurement of surrounding environments, to an M2M STA, and an STA performs sensing in response to the command and reports the results of the sensing to the server is common. In other words, unlike in the existing mode, it can be seen that a user accesses a network on the server side and the direction in the flow of information is reversed. Accordingly, for effective M2M communication, the functions of the existing STA need to be reduced, and a management function in a network needs to be expanded.

From this point of view, it can be seen that network management technology has to be taken into consideration again in an M2M WLAN system. In the previous network model, the network management function is also given to an STA because a user is placed on the STA side. In the M2M system, however, it is necessary to enhance the network management function on the server side because an STA has only to provide information in response to a command.

In a WLAN system supporting the M2M, however, several thousands of STAs connected to an AP may be taken into consideration in embodying an actual system. In this case, a method in which one STA occupies the same wireless medium and performs communication at once by using the existing CSMA/CS method may have a limit to effective network management. For example, unlike in the existing 2.4 GHz or 5 GHz, if a WLAN is operated in a band of 1 GHz or less represented by 700 to 900 MHz, the same transmit power versus to the coverage of an AP may be expanded about 2 to 3 times owing to the propagation characteristic of the band. It leads to a characteristic that a larger number of STAs is connected to one AP.

Figure 2:
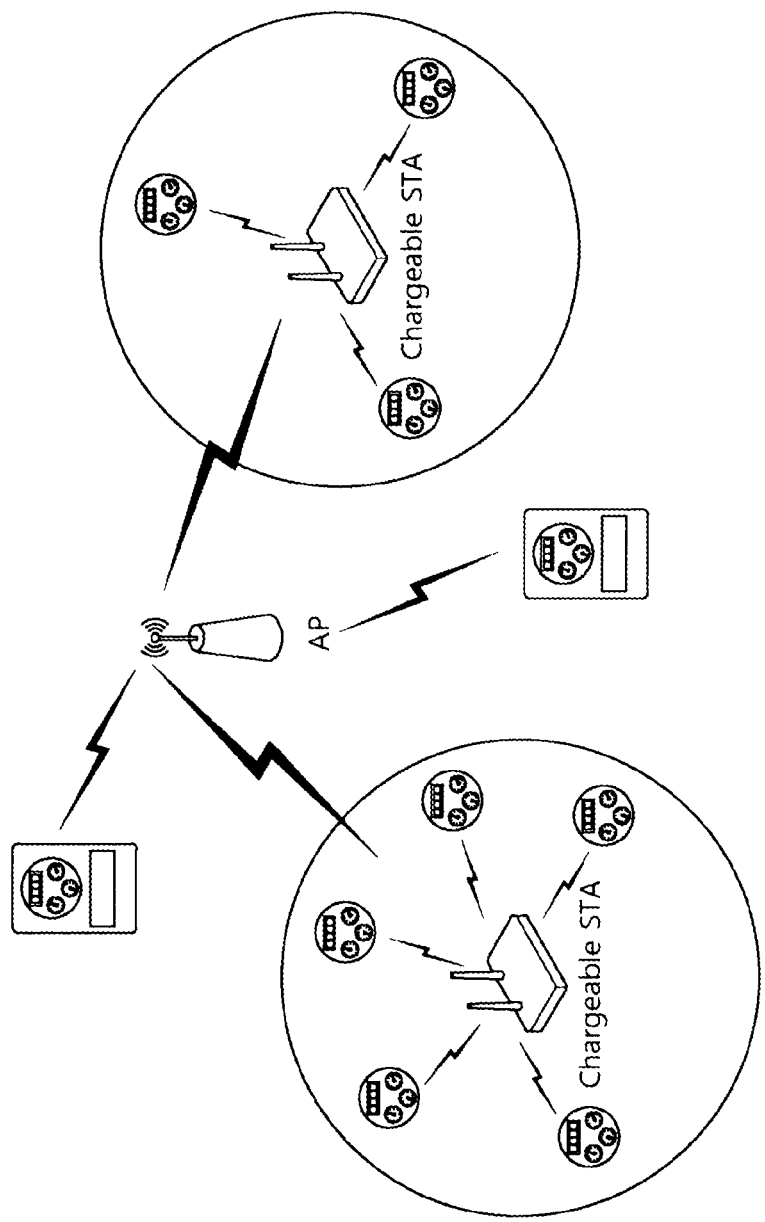
FIG. 2 is a diagram showing an example of an M2M WLAN system to which an embodiment of the present invention may be applied.

FIG. 2 is a diagram showing an example of an M2M WLAN system to which an embodiment of the present invention may be applied.

It is assumed that the M2M WLAN system shown in FIG. 2 includes an environment in which a number of STAs have accessed an AP. It is assumed that specific STAs of the STAs prefer near field low-power communication and communicate with an AP through a neighbor STA capable of providing a relay function. The STAs that prefer near field low-power communication may be, for example, battery-powered unchargeable M2M devices. The unchargeable M2M devices are hereinafter referred to as unchargeable STAs. STAs which provide a relay function between the unchargeable STAs and the AP may be battery-powered chargeable M2M devices. The devices are hereinafter referred to as chargeable STAs.

The chargeable STA may refer to an STA whose battery can be charged by a user, if necessary, at a position where the chargeable STA is installed by replacing or charging the battery. In contrast, the unchargeable STA may refer to an STA whose battery cannot be replaced owing to its position or several factors and whose battery has a capacity when the battery is first installed once the battery is installed. For the sake of convenience, an STA that prefers near field low-power communication is commonly designated as an 'unchargeable STA', and an STA capable of providing a relay function is commonly designated as a 'chargeable STA'. The unchargeable STA and the chargeable STA are names given for convenience of description, and it is evident that any device providing a relay function may belong to the chargeable STA in embodiments proposed by the present invention.

Referring to FIG. 2, the remaining STAs other than two chargeable STAs, from among STAs other than an AP, correspond to unchargeable STA. Each of the two chargeable STA can perform communication using full transmit power when communicating with the AP. Each of the two chargeable STA can perform transmission using low transmit power when communicating with peripheral low-power unchargeable STAs that are placed within a circle. In FIG. 2 an unchargeable STA placed outside the coverage of the chargeable STA illustrates an unchargeable STA which cannot discover a chargeable STA that will provide a relay function nearby or which communicates with an AP by using relatively high transmit power unlike other unchargeable STAs because it cannot discover a chargeable STA. In this communication system, it may be assumed that the unchargeable STA is directly associated with the AP and then the unchargeable STA communicates with the AP before it discovers a chargeable STA that provides a relay function to the unchargeable STA.

A method of an AP, a chargeable STA, and an unchargeable STA performing communication in an M2M WLAN system, such as that shown in FIG. 2, is described hereinafter. In particular, how a chargeable STA will support a relay function is described in detail.

An embodiment of the present invention provides a method in which a chargeable STA placed at near field performs communication by supporting a relay function while using relatively high power in order to increase the life span of unchargeable STAs in an M2M WLAN system. To this end, relay communication in a communication layer 2 (L2) step may be proposed. This may have a communication network structure of 2-hop or higher which is commonly called a mesh network. Meanwhile, if it is sought to embody relay communication in this mesh network structure, problems, such as the power consumption of a chargeable STA or complexity and time delay, may be added. Accordingly, there is proposed a communication method based on a relay protocol utilizing a communication layer 3 (L3) step so that a limited and maximum relay hop structure of about 1-hop or 2-hop is satisfied and packet forwarding between an AP and an unchargeable STA can be effectively performed.

In order to perform the packet forwarding through the L2, it is necessary for a chargeable STA to receive data including forwarding information. In order for the chargeable STA to receive the data and to be operated, pieces of information related to three or more addresses, including a transmission STA address, a reception STA address, and a destination STA address, need to be included in a transmission frame when a sender first transmits the transmission frame. That is, when a frame including forwarding information is received, the chargeable STA may determine whether it will transmit the frame to which hop based on the frame. A relay function can be supported by this L2 frame switching method. That is, in order to embody this L2 frame switching, a new packet forwarding method related to that the frame will be relayed on the L2 according to what method needs to be defined. Accordingly, complexity may be increased.

It is assumed that a frame transmission direction is called uplink when an unchargeable STA is a sender and an AP is a receiver and a frame transmission direction is called downlink when an AP is a sender and an unchargeable STA is a receiver, for convenience of description hereinafter. Furthermore, a communication method in uplink and a communication method in downlink are separately described.

First, the communication method of an unchargeable STA and a chargeable STA in uplink is described below with reference to the drawings.

Figure 3:
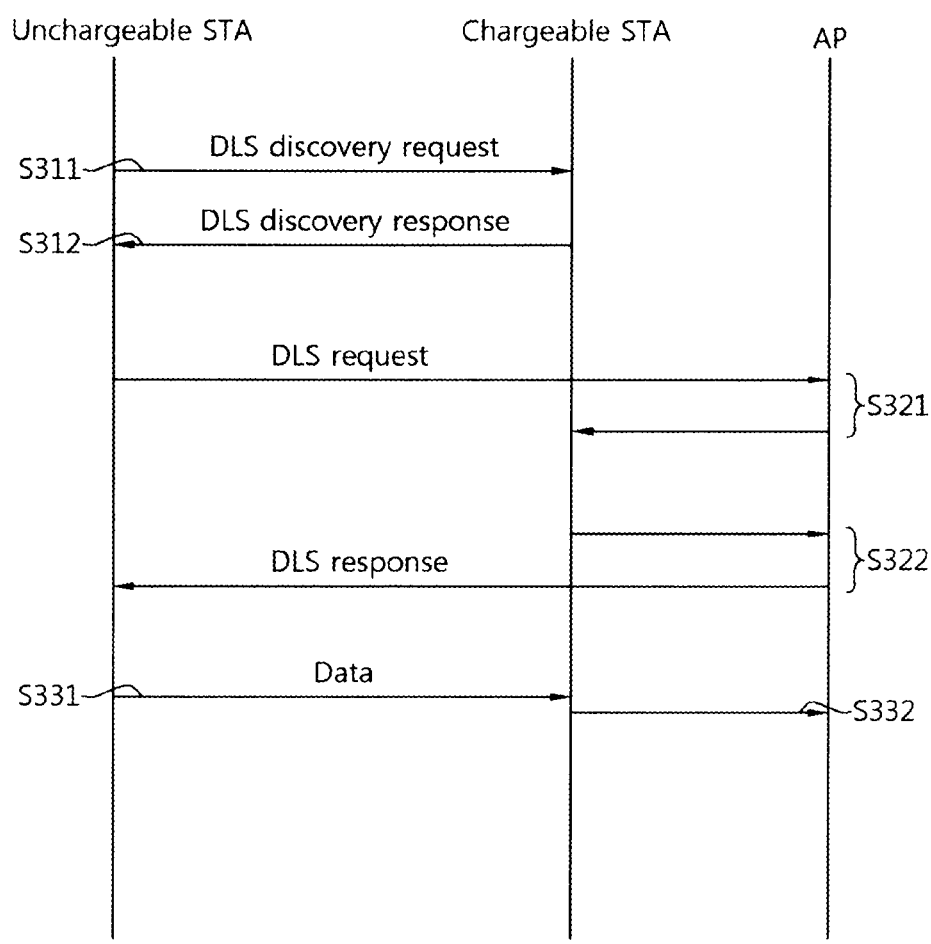
FIG. 3 is a diagram showing an uplink communication method according to an embodiment of the present invention.

FIG. 3 is a diagram showing an uplink communication method according to an embodiment of the present invention.

Referring to FIG. 3, an unchargeable STA performs a Direct Link Setup (DLS) process in order to set up a direct link with a chargeable STA that will become the gateway of the unchargeable STA. Prior to the DLS process, there is a need for a method of the unchargeable STA discovering the chargeable STA. To this end, there is proposed a method of the unchargeable STA broadcasting a DLS discovery request frame at step S311.

Figure 4:
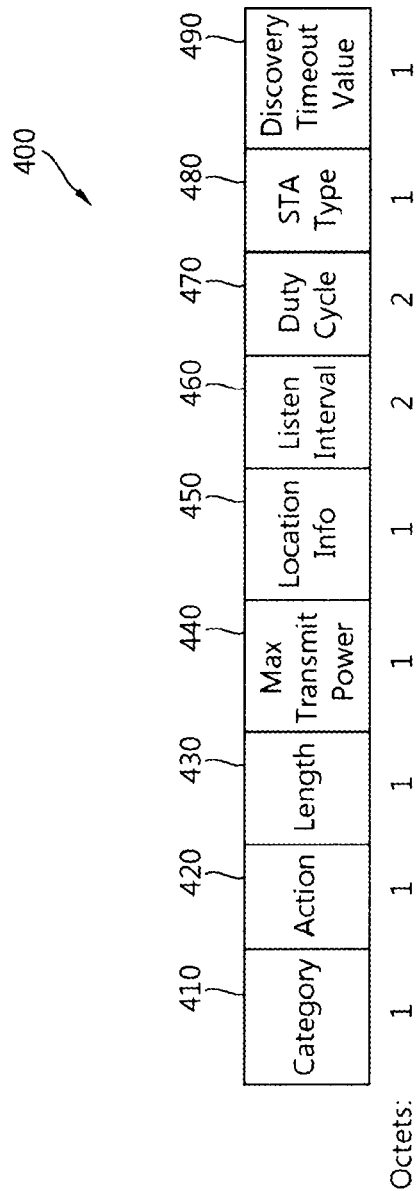
FIG. 4 is a block diagram showing the format of the DLS discovery request frame according to an embodiment of the present invention.

FIG. 4 is a block diagram showing the format of the DLS discovery request frame according to an embodiment of the present invention.

Referring to FIG. 4, the DLS discovery request frame 400 includes a category field 410, an action field 420, a length field 430, a full (or maximum) transmit power field 440, a location information field 450, a listen interval field 460, a duty cycle field 470, an STA type field 480, and a discovery timeout value field 490.

The category field 410 and the action field 420 are set to values indicating that the relevant frame is the DLS discovery request frame 400. The length field 430 may be set to indicate the length of the DLS discovery request frame 400 and/or the length of a bit sequence that forms the remaining fields subsequent to the length field 430.

The full transmit power field 440 is the maximum power of a transmitter, and it may indicate the full transmit power of an unchargeable STA.

The location information field 450 may include information about the location of a transmitter.

The listen interval field 460 may indicate a listen interval that is represented by a beacon interval related to a doze period.

The duty cycle field 470 may indicate a ratio of the time in an active state.

The STA type field 480 may indicate the application type of an unchargeable STA.

The discovery timeout value field 490 may indicate duration for which an unchargeable STA waits to receive a DLS discovery response frame after broadcasting the DLS discovery request frame 400.

Referring back to FIG. 3, after transmitting the DLS discovery request frame 400, the unchargeable STA may receive a DLS discovery response frame for duration indicated by the discovery timeout value field 490 at step S312. The unchargeable STA may receive one or more DLS discovery response frames from one or more chargeable STAs for the indicated duration.

Figure 5:
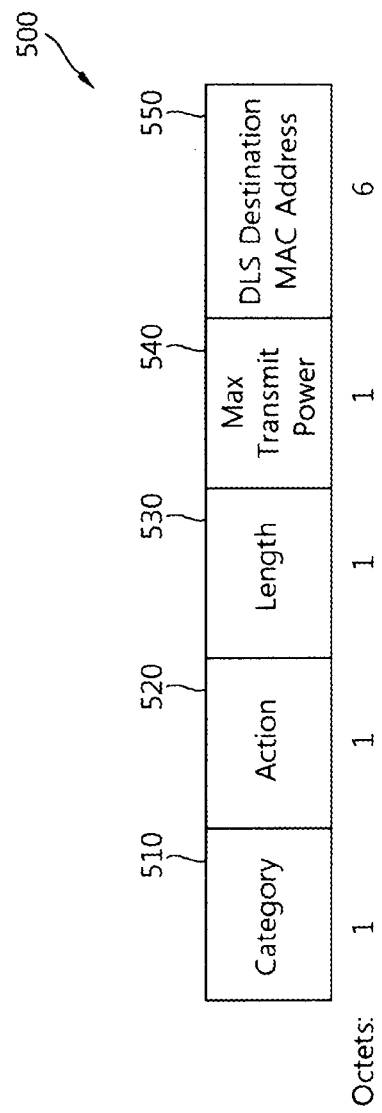
FIG. 5 is a block diagram showing the format of the DLS discovery response frame according to an embodiment of the present invention.

FIG. 5 is a block diagram showing the format of the DLS discovery response frame according to an embodiment of the present invention.

Referring to FIG. 5, the DLS discovery response frame 500 includes a category field 510, an action field 520, a length field 530, a full (or maximum) transmit power field 540, and a DLS destination address field 550.

The category field 510 and the action field 520 may be set to indicate that the relevant frame is the DLS discovery response frame 500.

The length field 530 may indicate the length of the DLS discovery response frame 500 and/or the length of a bit sequence that forms the remaining fields subsequent to the length field 530.

The full transmit power field 540 may indicate the same value as a value indicated by the full transmit power field 440 of the DLS discovery request frame 400 or may indicate a value different from a value indicated by the full transmit power field 440 of the DLS discovery request frame 400. If the full transmit power field 540 indicates a value different from a value indicated by the full transmit power field 440 of the DLS discovery request frame 400, the unchargeable STA that has received the DLS discovery response frame 500 uses transmit power smaller than the full transmit power indicated by the full transmit power field 540 when transmitting a radio signal to the chargeable STA.

The DLS destination address field 550 may indicate the MAC address of a chargeable STA. The unchargeable STA may check the MAC address of a chargeable STA when receiving the DLS discovery response frame 500. An unchargeable STA may perform a DLS procedure along with a chargeable STA by using the MAC address indicated by the DLS destination address field 550. That is, the unchargeable STA may request to set up a direct link by transmitting a DLS frame, including the MAC address of the chargeable STA, to the chargeable STA.

Referring back to FIG. 3, the unchargeable STA sets up a direct link with the chargeable STA after discovering the chargeable STA. The direct link may be set up in such a manner that the unchargeable STA transmits a DLS request frame, including the MAC address of the chargeable STA, to the chargeable STA via an AP at step S321 and in response thereto, the chargeable STA transmits a DLS response frame to the unchargeable STA via the AP at step S322.

After the direct link with the one chargeable STA is set up through the above-described method, the unchargeable STA transmits a frame by using a method of setting the final gateway using a routing protocol at the IP terminal. In this case, the present invention proposes a method of setting a chargeable STA not an AP or a final destination STA as the gateway and transmitting data. That is, when the chargeable STA receives the frame, L3 connection is formed between two devices; the unchargeable STA and the chargeable STA. In this state, the chargeable STA that has a frame forwarded thereto may perform relay by using a method of forming connection between a next destination STA, such as an AP (or eventually up to a router) and the chargeable STA through L3.

For example, when the unchargeable STA transmits a data frame to the AP, the unchargeable STA sets the address of the AP as a destination STA address and transmits the data frame to the chargeable STA at step S331. After checking that the destination STA address of the data frame received from the unchargeable STA is the AP, the chargeable STA relays the data frame to the AP at step S332.

The data frame may be transmitted from the unchargeable STA to the chargeable STA through the direct link set up between the two STAs. The data frame may be transmitted with transmit power equal to or smaller than full transmit power indicated by the full transmit power field included in the DLS discovery response frame.

In a communication environment, such as that shown in FIG. 2, the distance between the unchargeable STA and the chargeable STA is closer than the distance between the unchargeable STA and the AP. Accordingly, in order to limit full transmit power that may be used by the chargeable STA, transmit power indicated by the full transmit power field 540 of the DLS discovery response frame 500 may be set to indicate limited transmit power so that frames can be exchanged through the direct link between the chargeable STA and the unchargeable STA. The limited transmit power may be set to a value smaller than transmit power that has been used by the unchargeable STA in order to transmit a frame to the existing AP. In this case, there is an advantage in that the power consumption of the unchargeable STA can be reduced.

To this end, the chargeable STA may determine a full transmit power value that is indicated by the full transmit power field 540 of the DLS discovery response frame 500 on the basis of information about the location of the unchargeable STA, indicated by the location information field 450 of the DLS discovery request frame 400, and/or the full transmit power of the chargeable STA indicated by the full transmit power field 440. For example, a value indicated by the full transmit power field 540 of the DLS discovery response frame 500 may be set to be smaller than a value indicated by the full transmit power field 440 of the DLS discovery request frame 400 so that the transmit power of the unchargeable STA is limited.

The communication method of an unchargeable STA and a chargeable STA in downlink is described below.

Assuming that when a frame processed by a router terminal is transmitted, the final destination of the frame is an unchargeable STA, an Address Resolution Protocol (ARP) request frame for searching for a next hop using the IP address of the unchargeable STA is first broadcasted in order to transmit the frame. That is, the ARP request frame is broadcasted through an AP. The present invention proposes the three kinds of methods in relation to processes subsequent to the broadcasting of the ARP request frame. In a downlink communication method, it is hereinafter assumed that a DLS procedure between a chargeable STA and an unchargeable STA has been set up through the above-described uplink communication method.

1. When the Chargeable STA Turns Off a Proxy ARP Operation Mode

This method corresponds to the case where the chargeable STA does not perform a proxy ARP operation and the case where the unchargeable STA directly receives a broadcasted ARP request frame from an AP. That is, the AP can transmit a radio signal by using high power, and thus not only chargeable STAs within the coverage region of the AP, but also unchargeable STAs can receive the radio signal of the AP. Accordingly, this method may become the simplest downlink method. In response to the ARP request frame received from the AP, the unchargeable STA transmits an ARP response frame. A relay method of performing transmission toward the chargeable STA by using low power as described above may be used as an uplink transmission method for transmitting the ARP response frame. Not only the ARP, but also subsequent downlink transmission can be directly performed from the AP to the unchargeable STA.

2. When the Chargeable STA Performs a Proxy ARP Operation and the AP Knows the Execution of the Proxy ARP Operation This method is a method in which the chargeable STA transmits an ARP response frame in response to an ARP request frame like a proxy ARP for the unchargeable STA place. The present invention proposes a method in which the subject that plays a role of a gateway corresponding to the proxy of the unchargeable STA informs an AP that the subject is a chargeable STA. This indication message may be transmitted by the unchargeable STA or the chargeable STA. That is, the gateway of the unchargeable STA has informed the AP that the subject is the chargeable STA through the indication message. Thus, a frame to be subsequently transmitted to the unchargeable STA indicates that the frame has to be transmitted to the chargeable STA. This method can improve power reduction efficiency because unchargeable STAs may be in a doze state during the sections where the AP performs transmission. Accordingly, the life span of the battery of the unchargeable STA can be increased. That is, unchargeable STAs have only to be in an awake state during the sections where chargeable STAB perform transmission by using transmit power lower than a predetermined value and can receive data frames buffered in a chargeable STA at once during a doze state.

3. When the Chargeable STA Performs a Proxy ARP Operation and an AP does not Know the Proxy ARP Operation This method is the same as the second method in that the chargeable STA transmits an ARP response frame in response to an ARP request frame like a proxy ARP for the unchargeable STA place, but is different from the second method in that the subject that plays a role of a gateway corresponding to the proxy of the unchargeable STA does not inform an AP that the subject is a chargeable STA. That is, the AP will transmit a frame to the unchargeable STA by using a common method in the state in which the AP does not know that the gateway of the unchargeable STA is the chargeable STA. When the chargeable STA is operated as a proxy, the chargeable STA receives a frame in place of the unchargeable STA and also transmits a necessary response message. That is, in this method, the AP transmits a signal to the unchargeable STA, and the chargeable STA plays a role of the proxy of the unchargeable STA in a common proxy ARP form. In this method, like in the second method, during the section where the AP performs transmission, unchargeable STAs may be in a doze state. Accordingly, the life span of the battery of the unchargeable STAs can be increased. That is, the unchargeable STAs have only to be in an awake state only during the sections where chargeable STAs perform transmission by using transmit power lower than a predetermined value and may receive data frames buffered in the chargeable STA at once during a doze state.

Meanwhile, in downlink communication, a chargeable STA may relay a data frame based on information related to the doze state of an unchargeable STA which is included in the DLS discovery request frame 400. The chargeable STA may known when the unchargeable STA will be operated in the awake state on the basis of the listen interval 460 and the duty cycle field 470 included in the DLS discovery request frame 400. Accordingly, the chargeable STA may buffer a data frame intended to be transmitted to the unchargeable STA when the unchargeable STA is in the doze state although the data frame is received from an AP. Next, the chargeable STA may transmit the buffered data frame to the unchargeable STA in a time interval where the unchargeable STA is operated in the awake state.

In downlink communication described above, when the unchargeable STA directly receives the data frame from the AP, a common frame transmission and reception method between an AP and an STA is used. In contrast, when the chargeable STA receives the data frame from the AP and then relays the data frame, the data frame may be transmitted to the unchargeable STA through a direct link set up between the chargeable STA and the unchargeable STA.

Figure 6:
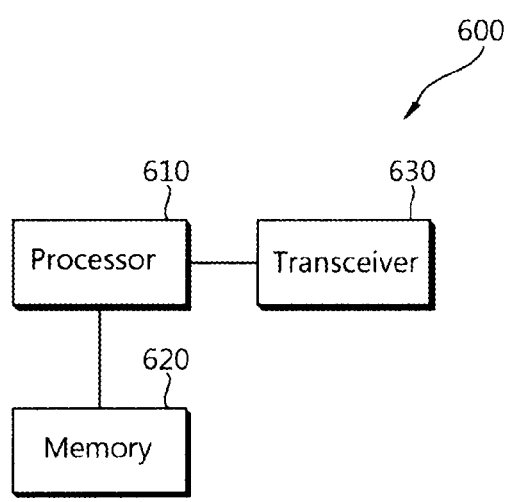
FIG. 6 is a block diagram showing a wireless apparatus to which the embodiments of the present invention may be applied.

FIG. 6 is a block diagram showing a wireless apparatus to which the embodiments of the present invention may be applied. The wireless apparatus may be an AP, a chargeable STA and/or an unchargeable STA.

Referring to FIG. 6, the wireless apparatus 600 includes a processor 610, memory 620, and a transceiver 630. The transceiver 630 transmits and receive radio signals, and the physical layer of IEEE 802.11 is embodied in the transceiver 630. The processor 610 is functionally connected to the transceiver 630 and is configured to embody the MAC layer and the physical layer of IEEE 802.11. The processor 610 may transmit and/or receive a DLS discovery request frame in order to discover one or more chargeable STAs. The processor 610 may be embodied to perform a process of exchanging a DLS request frame and a DLS response frame in order to set up a DLS between a chargeable STA and/or an unchargeable STA. The processor 610 may be embodied to relay a frame, received from an unchargeable STA, to an AP. The processor 610 may be embodied to receive a frame intended to be transmitted to an unchargeable STA from an AP and to relay the frame to the unchargeable STA. The processor 610 may be configured to embody the embodiments of the present invention described with reference to FIGS. 2 to 5.

The processor 610 and/or the transceiver 630 may include Application Specific Integrated Circuits (ASICs), other chipsets, logic circuits, and/or data processors. The memory 620 may include Read-Only Memory (ROM), Random Access Memory (RAM), flash memory, memory cards, storage media and/or other storage devices. When the above-described embodiment is implemented in software, the above-described scheme may be embodied by using a module (process or function) that performs the above function. The module may be stored in the memory 620 and executed by the processor 610. The memory 620 may be placed inside or outside the processor 610 and may be connected to the processor 610 using a variety of well-known means.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method in a WLAN (wireless local area network) system, the method comprising:
receiving, by a relay, a discovery request frame from a station (STA) for discovering a candidate relay relaying uplink data of the STA to an access point (AP), the discovery request frame including first information related to a first transmission capability for uplink data to be transmitted via a direct link between the STA and the AP;
transmitting, by the relay, a discovery response frame to the STA in a response to the discovery request frame, the discovery response frame including second information related to a second transmission capability for uplink data to be transmitted via a relay link configured between the relay and the AP, and
relaying, by the relay, a frame transmitted by the STA to the AP,
wherein the second transmission capability is determined based on criteria determined by the first transmission capability.

2. The method of claim 1,
wherein the relay transmits relay control information, and
wherein the relay control information includes an indication indicating a role of the relay as a relay.

3. The method of claim 1,
wherein the first information on the transmission capability for the uplink data includes information to determine a data rate of the uplink data via the direct link, and
wherein the second information on the transmission capability for the uplink data includes information to determine a data rate of the uplink data via the relay link.

4. The method of claim 1,
wherein the STA is powered by a small energy supply,
wherein the STA transmits information related to awake time of the STA to the relay, and
wherein the relay transmits a frame received from the AP during the awake time.

5. The method of claim 1,
wherein the discovery response frame further includes information related to power constraint to restrict maximum transmit power of the STA.

6. A relay in a wireless local area network (WLAN) system, the relay comprising:
a radio frequency (RF) unit configured to transmit or receive radio signals;
a processor operatively coupled to the RF unit and configured to:
receive a discovery request frame from a station (STA) for discovering a candidate relay relaying uplink data of the STA to an access point (AP), the discovery request frame including first information related to a first transmission capability for uplink data to be transmitted via a direct link between the STA and the AP,
transmit a discovery response frame to the STA in a response to the discovery request frame, the discovery response frame including second information related to a second transmission capability for uplink data to be transmitted via the relay link configured between the relay and the AP, and relaying, by the relay, a frame transmitted by the STA to the AP, wherein the second transmission capability is determined based on criteria determined by the first transmission capability.

7. The relay of claim 6, wherein the relay transmits relay control information, and wherein the relay control information includes an indication indicating a role of the relay as a relay.

8. The relay of claim 6, wherein the first information on the transmission capability for the uplink data includes information on a data rate of the uplink data transmitted via the direct link, and wherein the second information on the transmission capability for the uplink data includes information on a data rate of the uplink data transmitted via the relay link.

9. The relay of claim 6, wherein the STA is powered by a small energy supply, wherein the STA transmits the information related to awake time of the STA to the relay, and wherein the relay transmits a frame received from the AP during the awake time.

10. The relay of claim 6, wherein the discovery response frame further includes information related to power constraint to restrict maximum transmit power.

* * * * *